United States Patent [19]

Penry

[11] Patent Number: 4,585,123
[45] Date of Patent: Apr. 29, 1986

[54] STATUS-DISPLAYING DEVICE FOR VIDEO TAPE STORAGE JACKETS

[76] Inventor: Verlyn M. Penry, Rte. 2, Box 2446, Hermiston, Oreg. 97838

[21] Appl. No.: 761,962

[22] Filed: Aug. 2, 1985

[51] Int. Cl.⁴ ............................................ B65D 85/672
[52] U.S. Cl. ..................................... 206/387; 206/459
[58] Field of Search ................................ 206/387, 459

[56] References Cited

U.S. PATENT DOCUMENTS

| 4,422,550 | 12/1983 | Okamura | 206/387 |
| 4,433,780 | 2/1984 | Ellis | 200/387 |
| 4,496,048 | 1/1985 | Sykes | 206/387 |
| 4,512,470 | 4/1985 | Sieben | 206/387 |
| 4,518,275 | 5/1985 | Rauch, III et al. | |

Primary Examiner—Joseph Man-Fu Moy
Attorney, Agent, or Firm—Chernoff, Vilhauer, McClung, Birdwell & Stenzel

[57] ABSTRACT

A device for addition to or incorporation in the construction of a storage jacket for a video tape cassette, for providing an indication of the status of a video tape, by the position of a pivotably movable indicator member and the resulting display of one of at least two colored status-indicating area through a respective one of several status display openings in a fixedly located mask covering all of the indicating member except for a grip portion and those portions of the indicator member which are exposed through the display openings.

20 Claims, 10 Drawing Figures

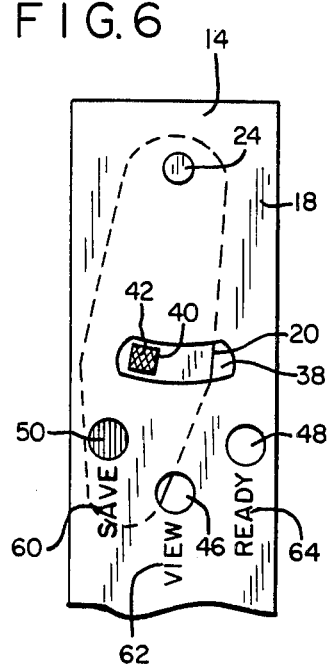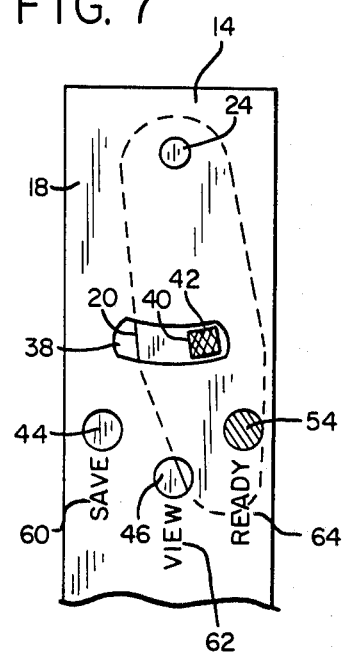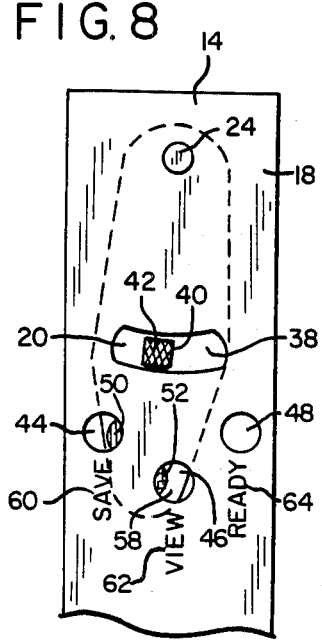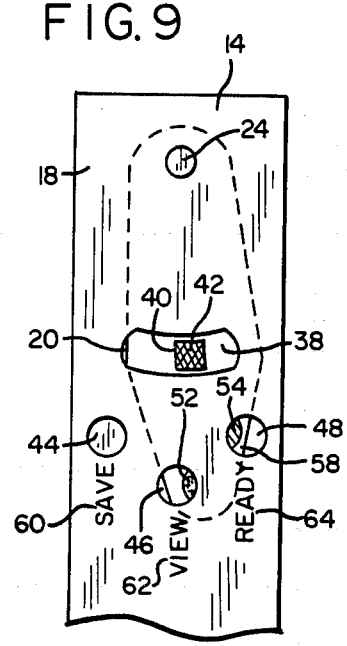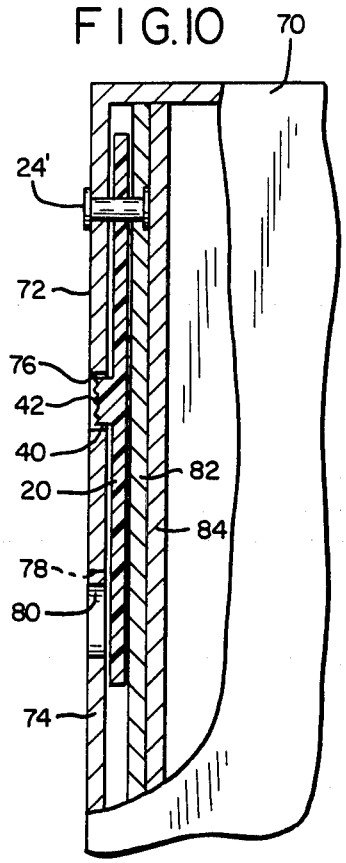

STATUS-DISPLAYING DEVICE FOR VIDEO TAPE STORAGE JACKETS

BACKGROUND OF THE INVENTION

The present invention relates to storage jackets for video tape cassettes, and more particularly to a device for use on such storage jackets for providing an indication of the status of material which may be recorded on the video tape cassette.

Since the advent of video tape cassette recorders, it has become common for owners of such recorders to have several video tape cassettes on which to record television programs as they are broadcast. Such recorded programs are stored for later viewing, for example, by members of a family who are unable to be present during the original broadcast of a program. Once all the interested members of a household have viewed a television program which is of no particular lasting value, the tape may again be used to record another program of some interest to the members of the household.

Video tape cassettes are commonly stored in cardboard boxes called jackets which are easily stored on a shelf in an upright position. Several of such cassettes, in their jackets, may be stored side by side as books are stored on a book shelf. It is a somewhat cumbersome process to check a tape contained in a jacket to determine whether it has available space for the recording of programs for later viewing of a person who is unable to be present during the original broadcast. Where one or more members of a household are routinely absent from the household during broadcast of a favorite television program, for example, it would be particularly desirable to be able to tell easily that a particular video tape can be used for recording of the favorite program without destroying a recording of a program which has not yet been viewed by all of the interested members of the houeshold. In the absence of a written label on the jacket containing a video tape cassette, it has previously been necessary to remove the cassette from the package, insert it into a video tape cassette player, and actually view a portion of the program to determine whether further material should be recorded on the video tape. It would be more convenient to have an easily useable status indicator located on the exterior of a video tape cassette jacket. However, no suitable indicator is known to be available for such a purpose, at least partly because of the small area available for the location of such an indicator on the back of a video tape cassette jacket, where it will be easily visible while the video tapes are stored side by side on a book shelf.

Preferably, a status indicating device should be able to display an indication of whether material on a video tape should be saved, whether it is ready to be viewed, or whether the tape is ready for additional material to be recorded thereon. Additionally, it would be useful to be able to indicate that a recording should be saved temporarily, or that the tape is ready for material to be recorded on the portion beyond the point at which the tape was stopped, but that rewinding of the tape is necessary before material already recorded on the tape could be viewed. Ideally, such a status indicating device could be attached easily to existing video tape cassette jackets or included in the construction of video tape cassette jackets.

While various indicating devices have been available in the past for different purposes, none of them is particularly well adapted for use as a status indicator on a video tape cassette jacket. For example, Caldwell U.S. Pat. No. 1,768,113 teaches an indicator which may be included in the construction of a file drawer. The Caldwell device, however, is adapted to display the volume of material contained within a drawer, and is not particularly well adapted for displaying several different types of status.

Yoshizawa U.S. Pat. No. 4,501,359 discloses a video tape cassette container having a window through which a lable located on the video tape cassette may be observed. The location of such a window and the corresponding label on a video tape cassette, however, do not make it possible to determine the status of the video tape cassette while it is stored among others on a book shelf.

Tomsyck et al, U.S. Pat. No. 4,501,396 discloses a gauge for displaying the amount of time left on a video tape cassette, but such a gauge does not provide a ready indication of whether or not additional material should be recorded on the tape over material which is already recorded.

Eilers U.S. Pat. No. 1,018,816 discloses a page recording device including a set of overlapping rotatable discs and openings through which numbers imprinted on each of the discs may be used to display a page number, instead of using an ordinary book mark. The amount of space available on the back portion of a video tape cassette jacket, however, is not large enough to permit practical use of the Eilers book page recording device as a video tape cassette status indicating device.

What is desired, then, is an inexpensive, easily used, and simply constructed device for indicating the status of a video tape cassette store within a jacket, so that the status of the video tape cassette is easily ascertained without removing the jacket from its storage position among other video tape cassette jackets on a shelf.

SUMMARY OF THE INVENTION

The present invention provides a status-indicating device particularly adapted for indicating the status of a video tape cassette contained within a jacket to which the status-indicating device may be attached or in which the status-indicating device may be incorporated. The device of the invention displays the status of the video tape cassette in a manner which is easily ascertainable while the jacket remains in a storage location on a book shelf, so that it is unnecessary to remove the video tape cassette from the storage jacket to determine whether the video tape is ready to be viewed, should be saved, or is ready for additional material to be recorded thereon. The device which is a preferred embodiment of the invention may be made small enough to fit easily within an area approximately ¾ inch wide by 2 inches in height, and comprises a pivotably mounted, easily movable indicator member which includes two or more colored statusindicating areas. The indicator member is covered by a mask having openings through which the colored areas may be viewed individually, depending upon the location of the indicator with respect to the mask. The indicator member is movable through an angle of several degrees by manipulation of a grip which is exposed through an aperture defined in the mask layer which covers the majority of the indicator member. Preferably, the status-indicating areas are of different colors, so that for each different status to be displayed by the device of the invention, a differently-colored indicator is displayed, in a respective different location, through the respective opening in the mask which corresponds to the particular status to be displayed.

It is also possible to display additional types of status by simultaneous exposure of small parts of adjacent status-indicating areas through the respective openings in the mask, by placing the movable indicator member in positions intermediate between the primary positions in which only a single indicator area is visible through its respective opening in the mask.

In a preferred embodiment of the invention the indicator member is made of sheet plastic material located between a mask of cardboard and a backing sheet of cardboard. A layer of adhesive material attached to the backing sheet may be used to attach the status-indicating device to the back of a video tape cassette jacket. Three colored status-indicating areas are provided in respective positions on the indicator and three status display openings are provided in the mask at locations spaced apart from one another further than the spacing between the respective colored areas on the indicator member. A grip molded in the plastic indicator extends outward through an aperture provided in the mask so that the grip may be utilized to pivot the flag to the appropriate status-indicating position, while the thickness of the cardboard mask prevents inadvertent contact with the grip which might cause movement of the indicator during normal handling of the video tape cassette in its jacket.

It is therefore a principal object of the present invention to provide a device which can be used to indicate whether a video tape cassette is ready to be played or to have additional material recorded on the video tape contained therein.

It is another important object of the present invention to provide a status-indicating device which is easily attached to existing jackets for video tape cassettes.

It is further object of the present invention to provide a status-indicating device which is easily included in the construction of a video tape cassette jacket.

It is yet a further object of the present invention to provide a video tape cassette status-indicating device which is easily visible and provides an indication of the status of a video tape cassette which may be interpreted easily from a considerable distance.

It is a primary feature of the status-indicating device of the present invention that it provides an indication of the status of a video tape both by the color and by the location of a displayed indicator.

It is another feature of the present invention that it provides a video tape cassette status indicator which is inexpensive and simple to manufacture.

It is yet a further feature of the status-indicating device of the present invention that it is easily adjusted yet unlikely to be accidentally changed to show an incorrect indication of status.

It is a principal advantage of the status-indicating device of the present invention that it is much more convenient to determine the status of a video tape cassette using the device of the invention than to play a portion of the material recorded on a video tape in order to determine whether recorded material should be saved or erased.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 6 is a view of a portion of the status indicator shown in FIG. 3 showing a different status.

FIG. 7 is a view of a portion of the status indicator shown in FIG. 3 showing another different status.

FIG. 8 is a view of a portion of the status indicator shown in FIG. 3 showing a further different status.

FIG. 9 is a view of a portion of the status indicator shown in FIG. 3 showing yet another different status.

FIG. 10 is a partially cutaway side view of a portion of a video tape cassette jacket incorporating a status indicator which embodies the present invention.

DETAILED DESCRIPTION OF THE INVENTION

Figure 1:
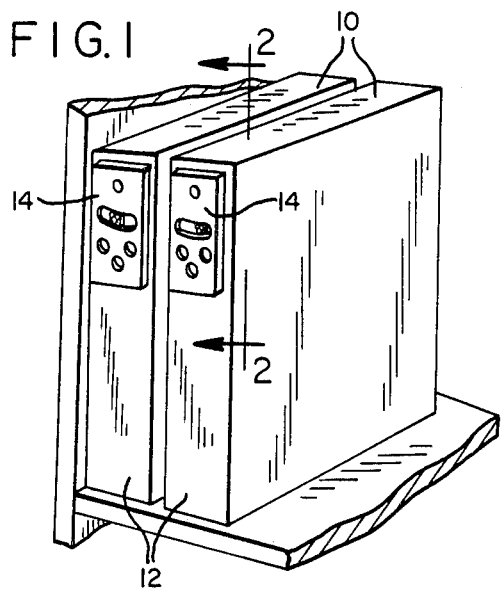
FIG. 1 is a pictorial view of a pair of video tape cassettes in jackets on which are mounted video tape status indicators embodying the present invention.
Figure 2:
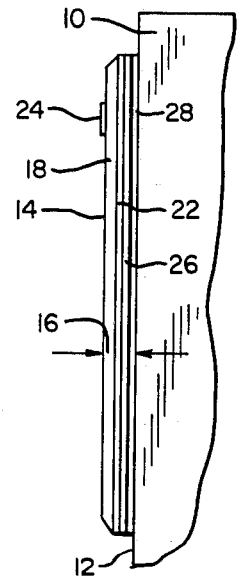
FIG. 2 is a side view, taken along line 2—2, of one of the video tape cassette jackets shown in FIG. 1, at an enlarged scale.

Referring now to the drawings, a pair of video tape jackets 10, shown standing on a shelf in an upright position, each include a plurality of walls defining a container for holding a video tape cartridge and thereby protecting it against dust and similar contamination when it is not in use. An upright back wall portion 12 of each jacket is normally visible when the jackets are standing side by side as shown in FIG. 1. A status indicating device 14 embodying the present invention is attached to the back wall 12 of each of the jackets 10, occupying a space of, for example, ¾ inch in width and 2 inches in height on the back wall 12. The status indicating device 14 has a thickness 16 (FIG. 2) of approximately ⅛ inch, in a preferred embodiment of the invention, although the thickness shown is exaggerated for the sake of clarity in depicting the construction of the device.

As may be seen in greater detail in FIGS. 3 and 4, the status-indicating device 14 comprises an outer layer, or mask 18, behind which is located an indicator member 20, as times hereinafter referred to as a flag 20. A base member 22 is located behind the indicator member 20, and a rivet 24 extends through the base member 22, the indicator member 20, and the mask 18, with the indicator member 20 being pivotable with respect to the mask 18, about a pivot axis defined by the rivet 24, within limitations which will be described presently. A backing layer 26 may be located behind the base member 22, and a layer of an adhesive material 28 is attached to the backing layer 26 (or the base member 22 if there is no backing layer 26). The adhesive material 28 is protected by a removable cover sheet 30 (FIG. 4) until it is desired to affix the statusindicating device 14 to a surface such as the back wall 12 of a video tape jacket 10. The mask 18, base member 22, and backing member 26 are connected fixedly to one another, as by the use of an adhesive joining the marginal portions 32 to one another. The mask 18, base member 22, and backing layer 26 are all made of a material which is stiff, yet flexible enough to withstand handling without being broken thereby. For example, cardboard of an appropriate thickness would be an acceptable material.

The indicator member 20 is preferably of a thin plastic material which will slide easily between the opposing surfaces 34 and 36, respectively, of the mask 18 and base member 22. Its edges are preferably smooth and rounded so as to prevent it from scraping the surfaces 34 and 36, but the mask 18 and base member 22 should be held closely enough together that the indicator member 20 will remain in the position in which it is placed.

Figure 3:
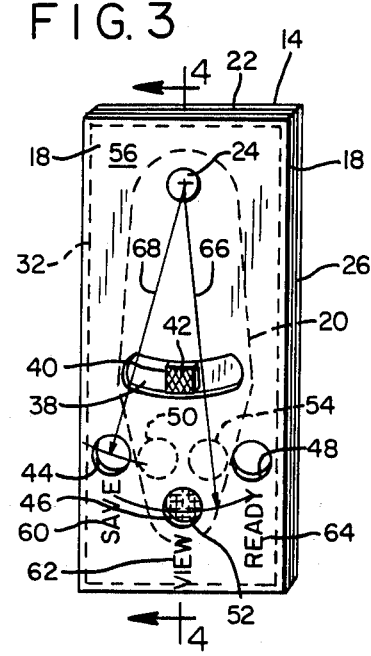
FIG. 3 is a perspective view, at an enlarged scale, of one of the video tape status indicators shown in FIG. 1.
Figure 4:
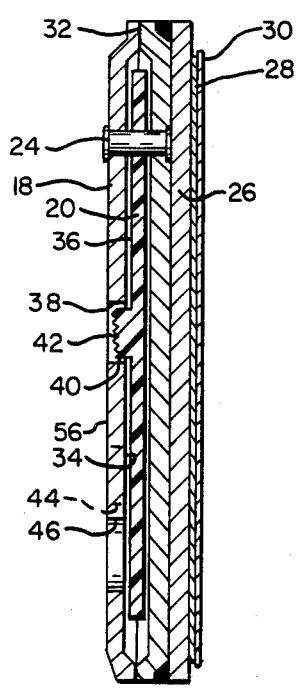
FIG. 4 is a sectional view of the video tape status indicator shown in FIG. 3, taken along line 4—4 and expanded laterally for additional clarity.

As may be seen in FIG. 3, the mask 18 defines a grip aperture 38, preferably in the form of an arcuate slot into which protrudes a raised grip portion 40 of the indicator member 20. The grip portion 40 has, preferably, a surface including a pattern of grooves 42, which may be parallel or may include intersecting sets of parallel grooves, in order to provide sufficient friction to enable one to rotate the indicator member 20 about the pivot axis defined by the rivet 24. The grip 40 should protrude, at most, to be flush with the outer surface 56 or only slightly exposed beyond the outer surface 56, to avoid unintentional contact which might change the displayed indication of status.

To the end of providing an indication of the status of a video tape, three status display openings 44, 46, and 48 are defined in the mask 18, extending therethrough to expose such portions of the indicator member 20 as may be located directly behind each of the status display openings at any particular time.

Figure 5:
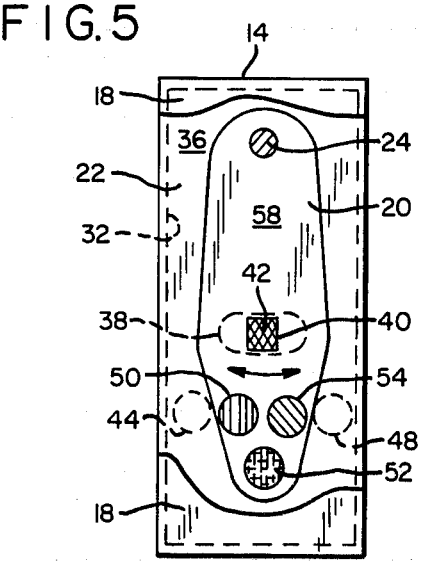
FIG. 5 is a front view of the video tape status indicator shown in FIG. 3, with its mask layer partially cut away.

As may best be seen in FIG. 5, the status indicator member 20 includes three status-indicating areas 50, 52, and 54. Preferably, the size of each of the status-indicating areas 50, 52, and 54 is approximately the same as the size of a corresponding one of the status display openings 44, 46, and 48. The arrangement of the status-indicating areas on the indicator member 20 differs, however, from the arrangement of the status display openings on the mask 18, so that when any one of the status-indicating areas is fully exposed through a corresponding one of the status display openings, neither of the other two status-indicating areas is visible through the mask 18. For example, when the status-indicating area 52 is visible through the status display opening 46, as shown in FIG. 3, neither the status-indicating area 50 nor the status-indicating area 54 is visible through the mask 18.

The outer surface 36 of the base member 22 and the front surface 58 of the indicator member 20 are preferably of the same color as the outer surface 56 of the mask 18. However, each of the status-indicating areas 50, 52, and 54 preferably has a different color. For example, the status-indicating area 50 may be red in color, the status-indicating area 52 may be yellow in color, and the status-indicating area 54 may be green in color, while the outer surface 56 of the mask 18, the front surface 58 of the indicator member 20, and the outer surface 36 of the base member are preferably all of a neutral color such as white, against which each of the other three colors contrasts clearly.

Indicia such as labels 60, 62, and 64 are provided on the mask 18 to indicate the meaning of a status-indicating area displayed through the respective status display opening with which each of the labels is associated. Thus, in FIG. 3 the yellow status indicating area 52 is displayed through the central status display opening 46 of the three status display openings, and the label 62, reading "VIEW," indicates that a video tape contained within the jacket 10, on which the status-indicating device 14 shown in FIG. 3 is located, is ready to be viewed.

Other positions of the indicator member 20 relative to the mask 18 provide indications of different status of a video tape contained within a jacket 10 on which the status-indicating device 14 is located. Thus, as in FIG. 6, the red color of the status-indicating area 50, when displayed through the status display opening 44, provides an indication by the color of the status-indicating area, the location in which the status-indicating area 50 is displayed, and by the label 60, reading "SAVE," that the material recorded on a video tape with which the status-indicating device 14 is associated should not be erased, but should be saved for subsequent viewing.

Likewise, display of the green status-indicating area 54, through the status display opening 48 at the opposite, or right, side of the status-indicating device 14 shows, as is indicated by the label 64, "READY," that a video tape is ready for new material to be recorded thereon.

It is preferred that only a single one of the status-indicating areas 50, 52, and 54 can be displayed through each of the status display openings 44, 46, and 48, so that there is no ambiguity as might result from the possibility of more than one status-indicating area 50 being exposed through a given one such as the centrally located status display opening 46. To that end, the status display opening 46 and status-indicating area 52 are located at a different radius 66 from the radius 68 on which the status-indicating areas 50 and 54 and the status display openings 44 and 48 are located, both radii being measured from the pivot axis defined by the rivet 24. While it would similarly be possible to locate the status display openings 44 and 48 and the corresponding status-indicating areas 50 and 54 at different radii, this is unnecessary because of the limited arc through which the indicator member 20 is permitted to rotate about the rivet 24 as a consequence of the narrow shape of the status-indicating device.

In addition to the three different statuses already described, it may be desirable to provide indications of additional types of status. For example, it may be desirable to indicate that a recording should be saved temporarily, as when the owner of the tape had already seen the recorded material on it but knew that a friend or another member of the household wished to view it before new material is recorded over it.

Such an indication that material already recorded should be saved temporarily may be made by moving the indicator member 20 to an intermediate position between the "VIEW" indication shown in FIG. 3 and the "SAVE" indication shown in FIG. 6, with the result that a portion of the yellow status-indicating area 52 is visible in the center status display opening 46, and a portion of the red status-indicating area 50 is visible through the left status display opening 44, as shown in FIG. 8. This simultaneous display of parts of two status-indicating areas requires that the status display openings be spaced further apart from one another than are the status-indicating areas on the indicator member 20, yet not so far apart that it is impossible to display parts of two status-indicating areas simultaneously in their respective status display openings. A preferred spacing results in about one third of the circular shape of each status-indicating area 50 and 52 being visible when the indicator member 20 is in the intermediate position shown in FIG. 8. By using different shapes, sizes, and spacings of the status-indicating areas and status display openings, as will be readily apparent, it will be possible to display simultaneously larger portions of each of a pair of adjacent status-indicating areas through the respective status display openings. However, it should be kept in mind that only one status-indicating area 50, 52, or 54 should be able to be displayed so that it fills an entire respective status display opening at any single time, and that when a status display opening is entirely filled by a respective status-indicating area there should be none of any of the other status-indicating areas visible in their respective status display openings.

Additionally, it may be desirable to provide an indication that there is some material recorded on the video tape which should be saved, at least for the time being, but that additional material can be recorded on that tape beyond the point at which the tape has been stopped. Thus, material already recorded on the tape could be viewed by rewinding the tape, but the indication is made that additional room is still available on the tape for recording. The main purpose of this indication is to use the full capacity of a tape instead of wearing out the first part of the tape by repetitive use while the rest of the tape remains relatively new. Of course, such use of the tape requires some planning to ensure that enough tape is available on the cassette for the material which it is desired to record.

Such an indication that the remaining amount of the tape on the video tape cassette is available for further recording can be provided using the device 14 as shown in FIG. 9, where the indicator 20 is located between the positions for indicating "VIEW" and "READY" respective portions of both the yellow status-indicating area 52 and the green status-indicating area 54 are visible through their respective status display openings 46 and 48.

While the status-indicating device 14 has been described hereinabove as a separately attached device which may be added to already-existing video tape jackets 10, a video tape jacket 70 includes a status-indicating device 72 in its original construction, as shown in sectional view in FIG. 10. In the device 72, the outer layer 74 of the jacket 70 incorporates the construction and function of the mask 18 of the status-indicating device 14, defining a grip aperture 76 and status display openings corresponding to the status display openings 44, 46, and 48 of the status-indicating device 14. While only the two status display openings 78 and 80 are shown in FIG. 10, it will be appreciated that another status display opening would be provided, corresponding to the status display opening 48.

As in the status-indicating device 14, an indicator member 20 is pivotally attached behind the mask portion of the outer layer 74 by a rivet 24' which extends through the outer layer 74 and a base layer 82. To protect the video tape cassette from being damaged by the exposed inner end of the rivet 24', an inner layer 84 may be provided in construction of the jacket 70. In function, the status-indicating device 72 is the same as the device 14.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A status indicator for attachment to a jacket for a video tape cassette, comprising:
   (a) a mask defining at least two status display openings extending therethrough, said status display openings being arranged in a predetermined pattern on said mask, and said mask further defining a grip aperture extending therethrough;
   (b) an indicator member mounted behind said mask for movement with respect thereto, a front side of said indicator member having a first color and including at least two status-indicating areas located thereon at respective predetermined locations, the respective color of each status-indicating area differing from said first color; and
   (c) grip means located on said indicator member for moving said indicator member pivotably with respect to said mask, said grip means being exposed through said grip aperture, and the locations of said status-indicating areas and said status display openings being so interrelated that for each status display area there is a position of said indicator member relative to said mask wherein at least a portion of the respective statusindicating area is visible through a respective corresponding status display opening, with no other part of any other status-indicating area being simultaneously visible through any other one of said status display openings.

2. The device of claim 1, including a base member located behind said indicator member, said indicator member being pivotally movable with respect to said base member and said mask being fixedly located with respect to said base member, said device further including adhesive means associated with said base member for attaching said device to a jacket for a video tape cassette.

3. The device of claim 1, said mask means including three of said status display openings and said indicator member having three of said status-indicating areas, said status display openings and said status-indicating areas being so located on said mask and said indicator member, respectively, and movements of said indicator member being so limited, that each of said status-indicating areas can be displayed only through a respective one of said status display openings.

4. The device of claim 3 wherein each of said status-indicating areas is at least as large as the respective one of said status display openings and is so located on said indicator member that it occupies the entire area of said respective status display opening only when no part of any other status-indicating area is visible in its own respective status display opening.

5. The device of claim 4, said status display openings and said status-indicating areas being so located that when said indicator is moved to an intermediate position between two positions, in each of which a respective indicating area is displayed through a respective status display opening, a respective portion of each of only two status-indicating areas is visible in each of two adjacent ones of said status display openings.

6. The device of claim 1, including means associated with said indicator member for defining a pivot axis about which said indicator member is pivotally movable with respect to said mask, wherein at least two of said status-indicating areas and their respective status display openings are located at respective different distances from said pivot axis.

7. The device of claim 1, including a base member located behind said indicator member, wherein each of said mask and said base member are of cardboard and said indicator member is of a synthetic plastic material.

8. The device of claim 7, said mask having a thickness and said grip means being raised with respect to the remainder of said indicator member and extending outward through said grip aperture in said mask a distance less than the thickness of said mask.

9. The device of claim 8 wherein said grip means has a surface including a pattern of intersecting grooves.

10. The device of claim 1 wherein each of said status-indicating areas has a respective color different from the color of each other one of said status-indicating areas.

11. In combination with a video tape jacket including a plurality of walls defining a container for protectively holding a video tape cartridge, a status indicator included in one of said plurality of walls, said status indicator comprising:
(a) a mask defining at least two status display openings extending therethrough, said status display openings being arranged in a predetermined pattern on said mask, and said mask further defining a grip aperture extending therethrough;
(b) an indicator member mounted behind said mask for pivotable movement with respect thereto, a front side of said indicator member having a first color and including at least two status-indicating areas located thereon at respective predetermined locations, the respective color of each status-indicating area contrasting with said first color; and
(c) grip means located on said indicator member for moving said indicator member pivotably with respect to said mask, said grip means being exposed through said grip aperture, and the locations of said status-indicating areas and said status display openings being so interrelated that for each status display area there is a position of said indicator member relative to said mask wherein at least a portion of the respective status-indicating area is visible through a respective corresponding status display opening, with no other part of any other status-indicating area being simultaneously visible through any other one of said status display openings.

12. The device of claim 11, including a base member located behind said indicator member, said indicator member being pivotably movable with respect to said base member and said mask being fixedly located with respect to said base member, said device further including adhesive means associated with said base member for attaching said device to a jacket for a video tape cassette.

13. The device of claim 11, said mask means including three of said status display openings and said indicator member having three of said status-indicating areas, said status display openings and said status-indicating areas being so located on said mask and said indicator member, respectively, and movements of said indicator member being so limited, that each of said status-indicating areas can be displayed only through a respective one of said status display openings.

14. The device of claim 13 wherein each of said status-indicating areas is at least as large as the respective one of said status display openings and is so located on said indicator member that it occupies the entire area of said respective status display opening only when no part of any other status-indicating area is visible in its own respective status display opening.

15. The device of claim 14, said status display openings and said status-indicating areas being so located that when said indicator is moved to an intermediate position between two positions, in each of which a respective indicating area is displayed through a respective status display opening, a respective portion of each of only two status-indicating areas is visible in each of two adjacent ones of said status display openings.

16. The device of claim 11, including means associated with said indicator member for defining a pivot axis about which said indicator member is pivotably movable with respect to said mask, wherein at least two of said status-indicating areas and the respective status display openings are located at respective different distances from said pivot axis.

17. The device of claim 11 including a backing layer, wherein each of said mask and said backing layer are of cardboard and said indicator member is a synthetic plastic material.

18. The device of claim 17, said grip means being raised with respect to the remainder of said flag and extending outward through said grip opening in said mask a distance less than the thickness of said mask.

19. The device of claim 18, wherein said grip means has a surface including a pattern of intersecting grooves.

20. The device of claim 11 wherein each of said status-indicating areas has a respective color different from the color of each other one of said status-indicating areas.

* * * * *

UNITED STATES PATENT AND TRADEMARK OFFICE
CERTIFICATE OF CORRECTION

PATENT NO. : 4,585,123
DATED : April 29, 1986
INVENTOR(S) : Verlyn M. Penry

It is certified that error appears in the above-identified patent and that said Letters Patent is hereby corrected as shown below:

| | |
|---|---|
| Col. 2, Line 11 | Change "lable" to --label--; |
| Col. 2, Line 33 | Change "store" to --stored--; |
| Col. 2, Line 56 | Change "statusindicating" to --status-indicating--. |
| Col. 4, Line 63 | Change "statusindicating" to --status-indicating--. |
| Col. 8, Line 26 | Change "statusindicating" to --status-indicating--. |

Signed and Sealed this
Ninth Day of December, 1986

*Attest:*

DONALD J. QUIGG

*Attesting Officer*  *Commissioner of Patents and Trademarks*